(12) United States Patent
Amparore et al.

(10) Patent No.: US 8,869,644 B2
(45) Date of Patent: Oct. 28, 2014

(54) ARTICULATED ROBOT WRIST

(75) Inventors: Mauro Amparore, Grugliasco (IT);
Giorgio Pernechele, Grugliasco (IT);
Giuseppe Paparella, Grugliasco (IT)

(73) Assignee: Comau S.p.A., Gruglaisco (Torino) (IT)

( * ) Notice: Subject to any disclaimer, the term of this patent is extended or adjusted under 35 U.S.C. 154(b) by 323 days.

(21) Appl. No.: 13/399,297

(22) Filed: Feb. 17, 2012

(65) Prior Publication Data

US 2012/0216649 A1    Aug. 30, 2012

(30) Foreign Application Priority Data

Feb. 24, 2011    (IT) .............................. TO2011A0158

(51) Int. Cl.
| B25J 17/00 | (2006.01) |
| B25J 17/02 | (2006.01) |
| B25J 18/00 | (2006.01) |
| B25J 19/00 | (2006.01) |

(52) U.S. Cl.
CPC .......... *B25J 17/0283* (2013.01); *B25J 19/0025* (2013.01); *Y10S 901/28* (2013.01); *Y10S 901/29* (2013.01)
USPC .................. 74/490.06; 74/490.05; 74/490.01; 901/28; 901/29

(58) Field of Classification Search
USPC ............... 74/490.01, 490.02, 490.03, 490.04, 74/490.05, 490.06, 490.07; 901/23, 24, 901/25, 26, 27, 28, 29
See application file for complete search history.

(56) References Cited

U.S. PATENT DOCUMENTS

| 5,606,235 A | * | 2/1997 | Mauletti ....................... 318/625 |
| 7,513,174 B2 | * | 4/2009 | Harada et al. ............... 74/490.06 |
| 2008/0223170 A1 | * | 9/2008 | Tealdi et al. ............... 74/490.06 |

FOREIGN PATENT DOCUMENTS

| EP | 1 829 652 A1 | 9/2007 |
| EP | 1 930 129 A1 | 6/2008 |
| EP | 1 970 171 A1 | 9/2008 |
| JP | 2006-289503 | 10/2006 |
| JP | 2006-289503 A | 10/2006 |

OTHER PUBLICATIONS

Italian Search Report, Dated Oct. 5, 2011.

\* cited by examiner

*Primary Examiner* — Troy Chambers
*Assistant Examiner* — Jake Cook
(74) *Attorney, Agent, or Firm* — Young Basile Hanlon & MacFarlane P.C.

(57) ABSTRACT

An articulated robot wrist includes a first body comprising a first and a second end, said first end being intended to be mounted on a robot component that is rotatable around a first axis; a second body comprising a first and a second end, said first end being rotatably mounted on said second end of said first body, around a second axis inclined with respect to said first axis; and a third body comprising a first and a second end, said first end being rotatably mounted on said second end of said second body, around a third axis inclined with respect to said second axis. The first and third axes are both substantially orthogonal to said second axis, and wherein in at least one position of said robot wrist said first and third axes result substantially aligned with one another.

8 Claims, 7 Drawing Sheets

ARTICULATED ROBOT WRIST

FIELD OF INVENTION

The present invention relates in general to an articulated robot wrist.

BACKGROUND

A robot wrist of the above indicated type is disclosed for example in European patent application EP 1 829 652 A1.

SUMMARY

Disclosed herein are embodiments of an articulated robot wrist. One embodiment is of the type comprising a first body comprising a first and a second end, said first end of said first body being intended to be mounted on a robot component that is rotatable around a first axis. A second body comprises a first and a second end, said first end of said second body being rotatably mounted on said second end of said first body around a second axis inclined with respect to said first axis. A third body comprises a first and a second end, said first end of said third body being rotatably mounted on said second end of said second body around a third axis inclined with respect to said second axis.

The first and third axes are both substantially orthogonal to said second axis, and in at least one position of said robot wrist, said first and third axes are substantially aligned to each other. The first body comprises a substantially elbow-shaped portion having at its base a first opening which is directed towards said second and third bodies and which is substantially aligned to said first axis in the mounted condition of said wrist.

The elbow-shaped portion carries an offset portion, corresponding to said second end of said first body, which is substantially arranged side by side and spaced apart with respect to the axis of said first opening.

The second body comprises a cantilever portion, corresponding to said second end of said second body, which has a second opening substantially aligned to said third axis, in the mounted condition of said robot wrist said first and second openings being traversed by cables and/or tubes for the supply and/or control of a device associated to said third body of the robot wrist.

The robot wrist can further comprise means for driving rotation of said second and third bodies, around said second and third axes, respectively. The means for driving rotation of said second and third bodies comprises a first motor carried by said offset portion of said first body, first gear means for transmission of the rotation of the output shaft of said first motor to said second body, a second motor carried by said second body and second gear means for transmission of the rotation of the output shaft of said second motor to said third body.

The object of the present invention is that of improving a robot wrist of this type, in particular by providing a structure more compact and less encumbering, wherein the various bodies forming the wrist are arranged with respect to one another in a configuration enabling wide reciprocal movements of the bodies themselves, in order to guarantee optimal wrist maneuverability.

BRIEF DESCRIPTION OF THE DRAWINGS

The invention will be now described, purely by way of non-limiting example, with reference to the annexed drawings, in which.

DETAILED DESCRIPTION OF EMBODIMENTS

In the following description various specific details are described in order to provide thorough understanding of the embodiments. The embodiments may be provided for example without one or more of these specific details, or through other methods, components or materials etc.

In other cases, known structures, materials or operations are not shown nor described in detail to avoid a bulky description of the various aspects of the embodiments. Therefore, references as used herein are only for convenience and do not define the scope of protection or the scope of the embodiments.

In the figures, reference numeral 10 designates an articulated robot wrist. As known in the art, a robot wrist of this type is to be mounted on a robot component and is to be provided with a tool or other operating apparatus which is supplied and/or controlled with cables and/or tubes which are directly associated with the structure of the wrist itself. These cables and/or tubes are shown diagrammatically in the figures and designated by reference C. They define what is called the "harness" of the robot wrist, the robot wrist being defined as being "harnessed" once the cables and/or tubes have been mounted thereon. These aspects will be not discussed herein in detail, since they are per se conventional in the art and will be explained only to the extent which is necessary for describing the wrist of the invention.

Wrist 10 comprises a first body 12 including a first end 12' and a second end 22. The first end 12' is to be mounted on a robot component (not shown) which is rotatable around a first axis IV.

Wrist 10 further comprises a second body 14 comprising a first end 14' and a second end 24. The first end 14' is rotatably mounted on the end 22 of body 12 around a second axis V inclined with respect to the first axis IV.

Furthermore, the robot wrist 10 comprises a third body 16 comprising a first end and a second end designated by reference 16". As shown in the figures, preferably the third body 16 is an annular body which is to be traversed by cables and/or tubes of the tool associated to the wrist and whose end 16" has a surface on which there are formed suitable seats for connection of this tool.

The first end of body 16 is rotatably mounted on the second end 24 of body 14 around a third axis VI inclined with respect to the second axis V. Axes IV and VI form an angle substantially of 90 degrees with respect to the second axis V (in other words, axes IV and VI are both substantially orthogonal to axis V). As shown in the figures, in given positions in space of the robot wrist, these axes are substantially aligned with each other. In particular, the configuration shown in the figures is maintained for all the positions of the wrist which, with respect to that shown, are displaced only as a result of a rotation of the robot wrist around axis IV.

It is to be noted that in the present description, when reference is made to an orthogonal condition between two axes or straight lines, this may be applied both to the case of lines or axes which intersect each other and are perpendicular relative to each other, and to the case of lines or axes which do not intersect with each other but have their projections on a common plane parallel to them which form an angle substantially of 90 relative to each other.

Figure 1:
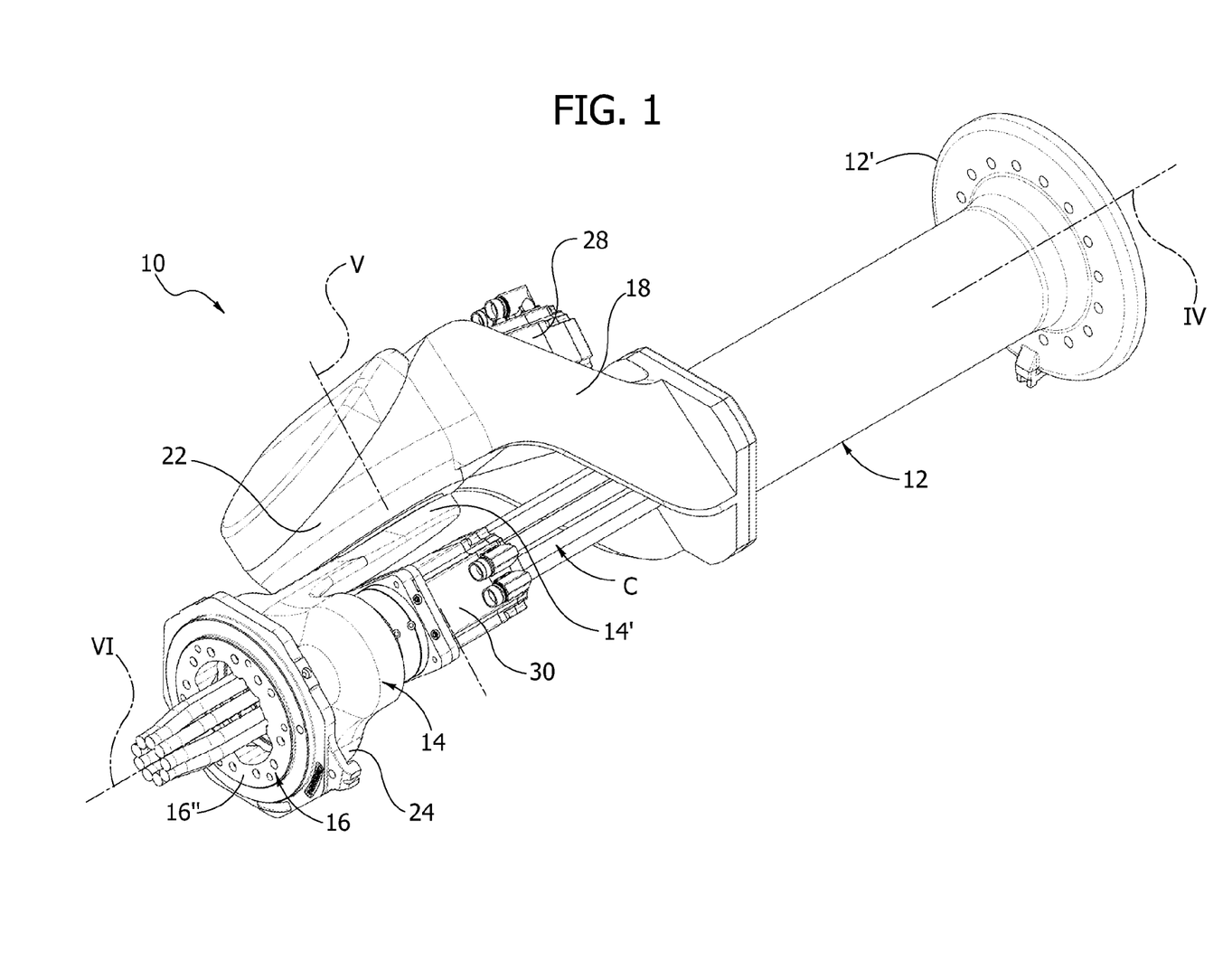
FIG. 1 represents a perspective view of a first embodiment of the robot wrist described herein.
Figure 2:
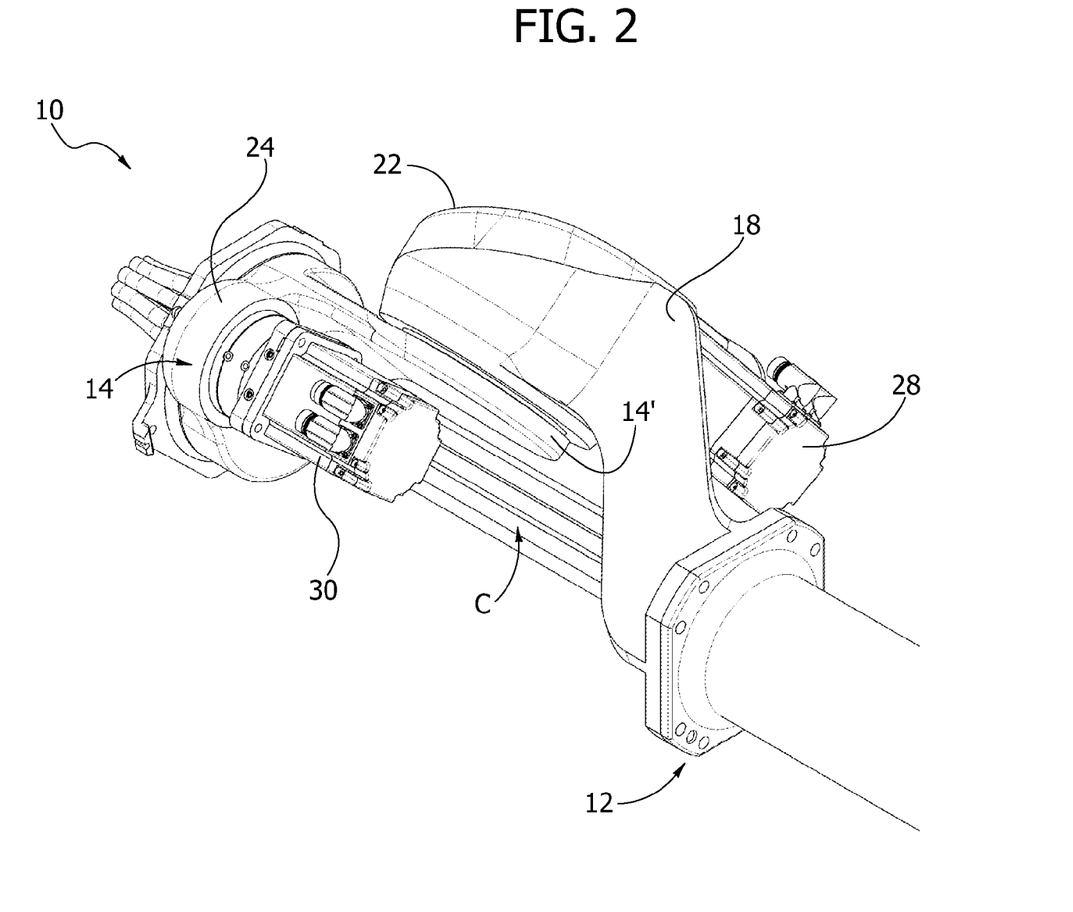
FIG. 2 represents a perspective view of the robot wrist of FIG. 1, from a view-point opposite to the one of FIG. 1.

More specifically, the first body 12 comprises a substantially elbow-shaped portion 18 which has, at its base, a first opening 20 facing towards the second body 14 and the third body 16. In the mounted condition of the wrist, the opening 20 is substantially aligned with the first axis IV. Furthermore, the elbow-shaped portion 18 carries an offset portion 22, corresponding to the above-cited second end of the first body 12, which is substantially arranged side by side, and spaced apart, with respect to the axis of opening 20. On this offset portion the second body 14 is rotatably mounted around the second axis V. The second body 14 has a cantilever portion 24, corresponding to the above mentioned second end of the second body 14, which has a second opening 26 substantially aligned with the third axis VI. In the mounted and "harnessed" condition of the robot wrist, the first opening 20 and the second opening 26 are both traversed by cables and/or tubes C of the tool associated with the third body 16. As visible from FIG. 1, due to the general configuration which is defined by portions 18 and 22, there is formed a passage for the cables and/or tubes C such that these cables and the tubes are held within the overall lateral dimension of the robot wrist, so as to avoid that they may interfere with the operations of the wrist itself. Furthermore, in the mounted and "harnessed" condition of the robot, the cables and/or tubes C extend, for a portion of their length, substantially aligned with axis IV and, for another portion of their length, substantially aligned with axis VI. This condition provides a reduction to a minimum of the torsional and bending stresses to which the cables are subjected during the manoeuvres of the robot wrist.

In the robot wrist described herein, the means for driving the rotation of the second body 14 and the third body 16 are mounted directly on the structure of the wrist itself. In particular the driving means comprise a first motor 28, which is carried by the offset portion 22 of the first body 12 and is adapted to drive rotation of the second body 14. The driving means further comprise a second motor 30, which is carried by the second body 16 and is adapted to drive rotation of the third body 16. As will be described more in detail in the following, these driving means further comprise first gear means for transmitting the rotation of the output shaft of said first motor 28 to said second body 14, and second gear means for transmitting the rotation of the output shaft of the second motor 30 to the third body 16.

In the robot wrist described herein, the first motor 28 is mounted on the offset portion 22 of the first body 12, oriented so that its output shaft is neither parallel nor orthogonal to the first axis IV; to the contrary, the output shaft of the first motor 28 is inclined with respect to the first axis IV by an angle between 0° and 90°, extreme terms excluded. In particular, the first motor 28 is oriented with respect to the first axis IV so as to stay, at least for most of its radial and axial dimensions, within the overall radial and axial dimensions of the elbow-shaped portion 18 together with the offset portion 22. In the illustrated example, the motor 28 stays substantially completely within the above-mentioned overall dimensions.

In the robot wrist described herein, the first axis IV and the second axis V are contained substantially in one and the same plane. The first motor 28 is preferably mounted on the offset portion 22 of the first body 12 so that the output shaft of the first motor 28 is substantially contained in the plane defined by the first axis IV and the second axis V (see FIGS. 3 and 4 and FIGS. 6 and 7). Furthermore, the first motor 28 is mounted on the offset portion 22, oriented so that its output shaft is inclined with respect to the first axis IV by an angle between 0° and 90°, extreme terms excluded. Even more preferably, the output shaft of the first motor 28 is inclined with respect to the first axis IV by an angle between 5° and 30°. In various embodiments, as well as in those shown in the figures, the offset portion 22 is specifically arranged to receive motor 28 in the configuration above described, whereas in other embodiments the offset portion is of known type and suitable means are provided for mounting motor 28 in such configuration.

In various embodiments, as well as in those shown in the figures (see in particular FIGS. 4 and 7), the output shaft of motor 28 carries a conical gear wheel 32 engaging a conical gear wheel 34 carried by a shaft 36. Shaft 36 is rotatably mounted on the offset portion 22 around the second axis V, with the interposition of a reducer means 40 which is coaxial with respect to shaft 36. Particularly, reducer means 40 is fixed to the edges of an opening 22' of the offset portion 22 by means of a sleeve 43. On the reducer means 40 itself there is fixed the second body 14. Reducer means 40 is adapted to connect in rotation shaft 36 with second body 14.

Figure 3:
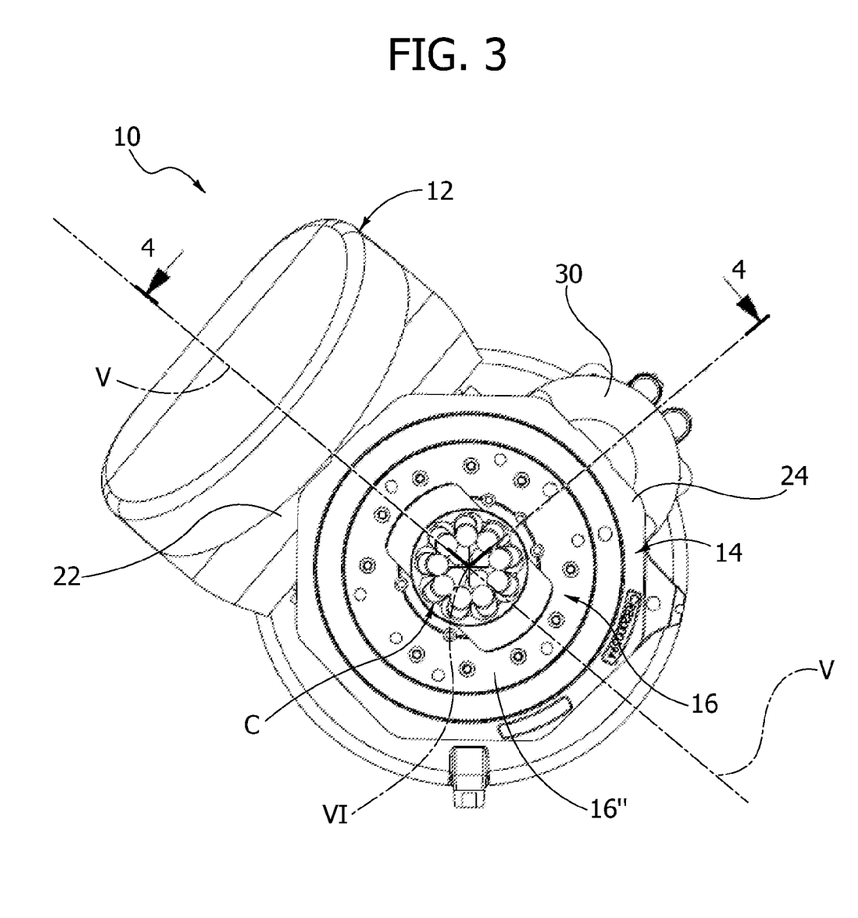
FIG. 3 represents a front view of the robot wrist of FIG. 1.
Figure 4:
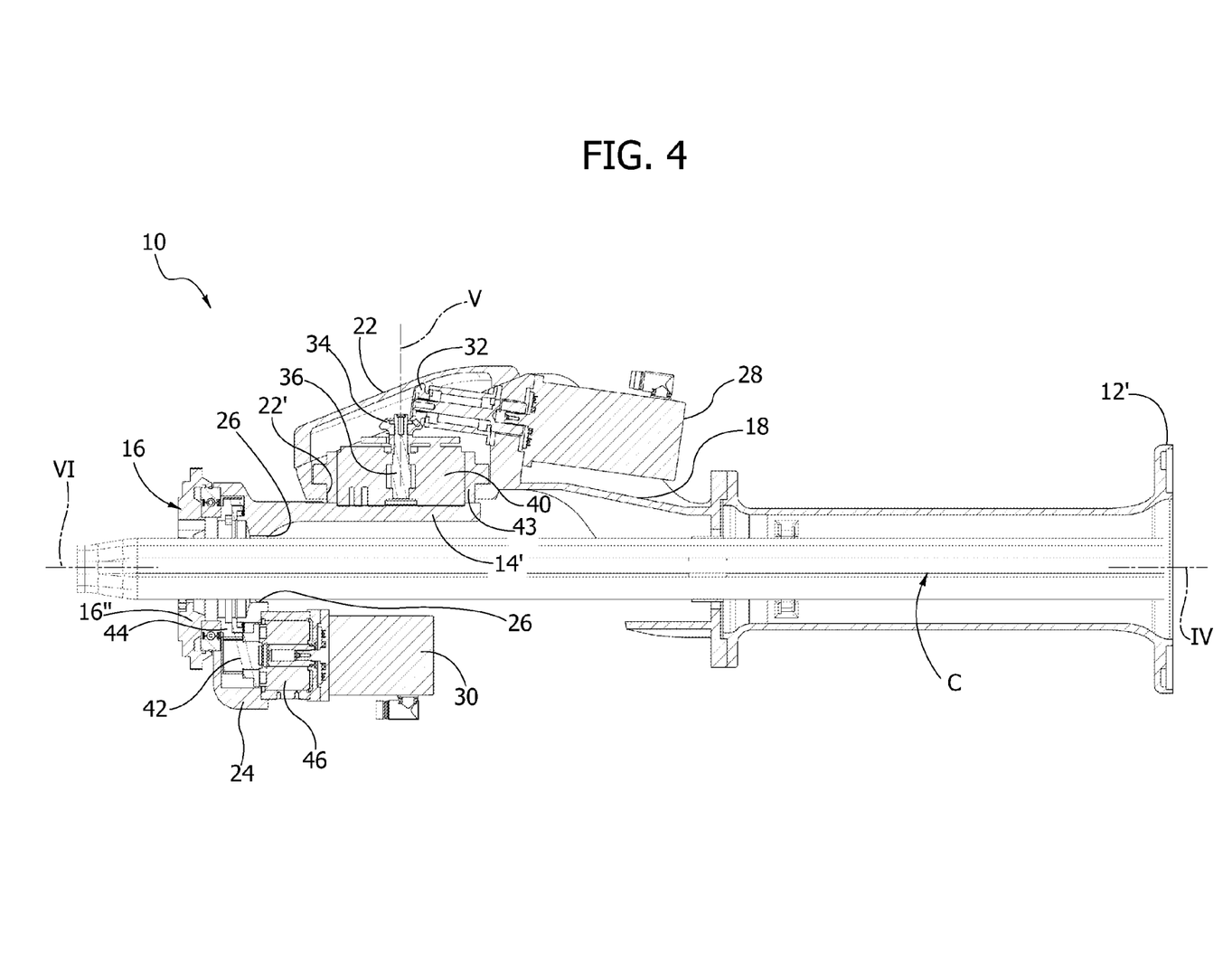
FIG. 4 represents a cross-sectional view taken along the longitudinal sectional plane diagrammatically shown by line 4-4 of FIG. 3.
Figure 5:
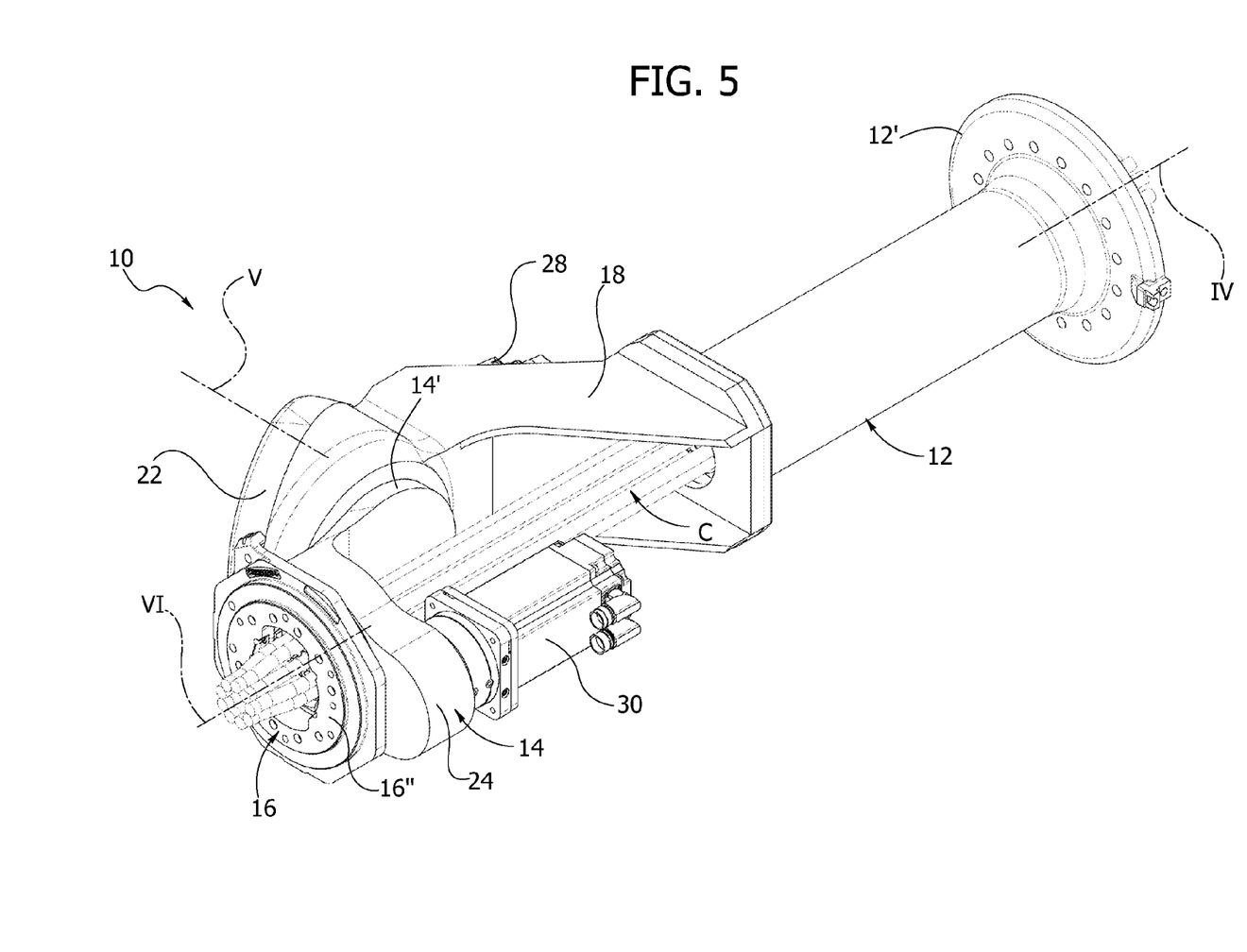
FIG. 5 shows a perspective view of a second embodiment of the robot wrist described herein.
Figure 6:
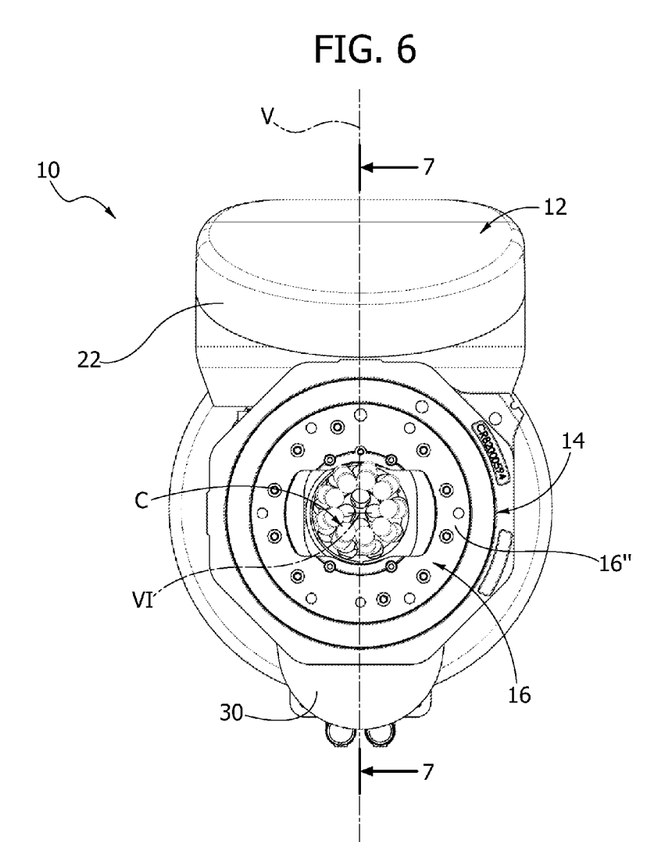
FIG. 6 shows a front view of the wrist of FIG. 5.
Figure 7:
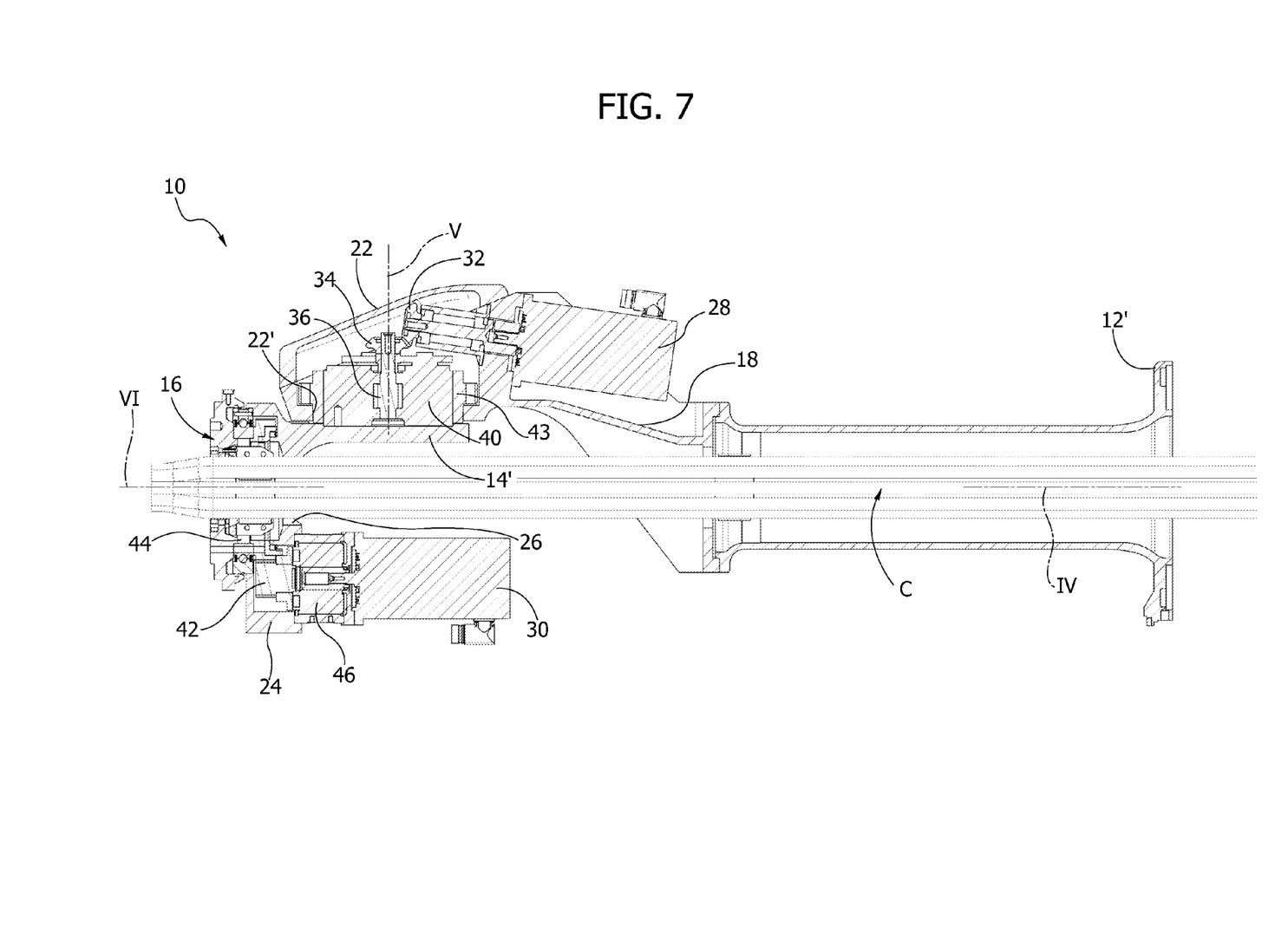
FIG. 7 represents a cross-sectional view taken along the longitudinal sectional plane diagrammatically shown by line 7-7 of FIG. 6.

With particular reference to FIGS. 3 and 6, second motor 30 is mounted on the cantilever portion 24 of the second body 14, with its own output shaft substantially parallel to the third axis VI. Furthermore, the cantilever portion 24 is adapted to receive the second motor 30 in a position in space such that the output shaft of the second motor 30 is spaced apart with respect to the third axis VI, along a direction extending, with respect to the second axis V, at an angle between 90° and 270°, preferably between 90° and 180°. The means for fixing the second motor in the configuration above described can be of any known type suited to the purpose.

In the embodiment of figures from 1 to 4, the cantilever portion 24 is adapted to receive the second motor 30 in a position in space such that the output shaft of the second motor 30 is spaced apart with respect to the third axis VI, along a direction extending, with respect to the second axis V, at an angle of about 90° or slightly greater. In the embodiment shown in figures from 5 to 7, the cantilever portion 24 is adapted to receive the second motor 30 in a position in space such that the output shaft of the second motor 30 is spaced apart with respect to the third axis VI, along a direction extending, with respect to the second axis V, at an angle of about 180°.

In both the embodiments described above, the output shaft of motor 30 is connected to a pinion 42 engaging a gear rim 44. Gear rim 44 is rotatably mounted on the cantilever portion 24 around the third axis VI, and is connected in rotation to the third body 16. In various embodiments, as well as in those shown in the figures, in the "harnessed" condition of the robot wrist the gear rim 44 is traversed by the cables and/or the tubes C. In various embodiments, as well as in those shown in the figures, motor 30 is attached to the cantilever portion 24 with the interposition of a reducer means 46. The reducer means 46 connects in rotation the output shaft of motor 30 with pinion 24.

In view of the foregoing, the transmission of movement to the second and the third bodies, respectively in the rotations around axes V and VI, are obtained as described in the following.

When the first motor 28 is activated, gear wheel 32 drives rotation of shaft 36, by engaging gear wheel 34 carried thereby. Shaft 36 transmits the movement to the reducer means 43, which carries out a multiplication of torque, finally transmitting the rotation to the second body 14.

When the second motor 30 is activated, reducer means 46, carrying out a multiplication of the torque, transmits the movement to pinion 42, which, by engaging gear wheel 44, finally drives rotation of the third body 16.

It is finally to be noted that the above-mentioned motors 28 and 30 described above, as well as reducer means 46 and 43, have not been described herein in detail, since they can be of any type which is conventionally used in the field of robots. Similarly, some constructional details shown in the figures have not been described, to avoid an unnecessary complicated description, but they will be anyway clearly evident to the persons skilled in the art.

Naturally, while the principle of the invention remains the same, the details of construction and the embodiments may widely vary with respect to what has been described purely by way of non limiting example, without departing from the scope of the invention, as defined in the annexed claims.

What is claimed is:

1. An articulated robot wrist, comprising:
   a first body comprising a first and a second end, said first end of said first body being configured to be mounted on a robot component that is rotatable around a first axis;
   a second body comprising a first and a second end, said first end of said second body being rotatably mounted on said second end of said first body, around a second axis inclined with respect to said first axis; and
   a third body comprising a first and a second end, said first end of said third body being rotatably mounted on said second end of said second body, around a third axis inclined with respect to said second axis,
   wherein said first and third axes are both substantially orthogonal to said second axis, and wherein in at least one position of said robot wrist said first and third axes result substantially aligned with one another,
   wherein said first body comprises an elbow-shaped portion having a base with a first opening facing towards said second and third bodies, and arranged substantially aligned with said first axis in the mounted condition of said robot wrist,
   wherein said elbow-shaped portion carries an offset portion, corresponding to said second end of said first body, which is arranged spaced apart with respect to the axis of said first opening,
   wherein said second body comprises a cantilever portion corresponding to said second end of said second body which has a second opening substantially aligned with said third axis, and wherein in the mounted condition of said robot wrist, said first and second openings are traversed by cables and/or tubes for the supply and/or control of a device associated to said third body of the robot wrist, said robot wrist further comprising:
   means for driving rotation of said second and third bodies around said second and third axes, respectively, wherein said means for driving rotation of said second and third bodies comprise:
   a first motor carried by said offset portion of said first body;
   first gear means for transmitting rotation of the output shaft of said first motor to said second body;
   a second motor carried by said second body; and
   second gear means for transmitting rotation of the output shaft of said second motor to said third body;
   said robot wrist being characterized in that said first motor is mounted on said offset portion of said first body, oriented so that the output shaft of said first motor is inclined with respect to said first axis by an angle between 0° and 90°, without being either parallel or orthogonal to the first axis.

2. The articulated robot wrist according to claim 1, wherein said second motor is mounted on said cantilever portion of said second body with its own output shaft substantially parallel to said third axis, and wherein said cantilever portion is adapted to receive said second motor in a position in space such that said output shaft of said second motor is spaced apart with respect to said third axis along a direction extending, with respect to said second axis, at an angle between 90° and 270°.

3. The articulated robot wrist according to claim 1, wherein a first conical gear wheel is mounted on the output shaft of said first motor and engages a second conical gear wheel carried by a first shaft, said first shaft being rotatably mounted on said offset portion, around said second axis, and adapted to drive rotation of said second body.

4. The articulated robot wrist according to claim 2, wherein between said second body and said first shaft there are set a reduction gear means which is coaxial with said first shaft and adapted to connect in rotation said first shaft with said second body.

5. The articulated robot wrist according to claim 2, wherein the output shaft of said second motor is connected to a pinion engaging a first gear rim, wherein said first gear rim is rotatably mounted on said cantilever portion around said third axis, and is fixed in rotation to said third body, in the mounted condition of said robot said gear rim being traversed by one or both of said cables or tubes.

6. The articulated robot wrist according to claim 5, wherein said second motor is attached to said cantilever portion through the interposition of a reducer means which connects in rotation the output shaft of said second motor with said pinion.

7. The articulated robot wrist according to claim 1, wherein said first motor is oriented so that the output shaft of said first motor is inclined with respect to said first axis by an angle between 5° and 30°.

8. The articulated robot wrist according to claim 1, wherein said second motor is mounted on said cantilever portion of said second body with its own output shaft substantially parallel to said third axis, and wherein said cantilever portion is adapted to receive said second motor in a position in space such that said output shaft of said second motor is spaced apart with respect to said third axis along a direction extending, with respect to said second axis, at an angle between 90° and 180°.

* * * * *